US010489681B2

(12) United States Patent
Pau et al.

(10) Patent No.: US 10,489,681 B2
(45) Date of Patent: Nov. 26, 2019

(54) METHOD OF CLUSTERING DIGITAL IMAGES, CORRESPONDING SYSTEM, APPARATUS AND COMPUTER PROGRAM PRODUCT

(71) Applicant: STMicroelectronics S.r.l., Agrate Brianza (IT)

(72) Inventors: Danilo Pietro Pau, Sesto San Giovanni (IT); Emanuele Plebani, Sotto II Monte Giovanni XXIII (IT); Luca Paliotto, Oggiona Con Santo Stefano (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 151 days.

(21) Appl. No.: 14/958,041

(22) Filed: Dec. 3, 2015

(65) Prior Publication Data
US 2016/0307068 A1 Oct. 20, 2016

(30) Foreign Application Priority Data
Apr. 15, 2015 (IT) ............................... TO2015A0218

(51) Int. Cl.
*G06K 9/46* (2006.01)
*G06K 9/62* (2006.01)

(52) U.S. Cl.
CPC ......... *G06K 9/6223* (2013.01); *G06K 9/6215* (2013.01)

(58) Field of Classification Search
CPC ................ G06K 9/6215; G06K 9/6223; G06F 17/30247
See application file for complete search history.

(56) References Cited

U.S. PATENT DOCUMENTS

| 8,209,330 B1 * | 6/2012 | Covell .............. G06F 17/30265 707/728 |
| 8,352,465 B1 * | 1/2013 | Jing .................. G06F 17/30867 707/723 |
| 2002/0087538 A1 | 7/2002 | Abdel-Mottaleb et al. |
| 2005/0123886 A1 * | 6/2005 | Hua ....................... G10H 1/361 434/307 A |
| 2006/0153460 A1 * | 7/2006 | Kim .................. G06F 17/30256 382/225 |

(Continued)

FOREIGN PATENT DOCUMENTS

WO 00/34893 A1 6/2000

OTHER PUBLICATIONS

Andreopoulos et al., "Multiple Layer Clustering of Large Software Systems," *Proceedings of the 12th Working Conference on Reverse Engineering (WCRE '05)*, 2005, 10 pages.
(Continued)

*Primary Examiner* — Sean T Motsinger
(74) *Attorney, Agent, or Firm* — Seed IP Law Group LLP

(57) ABSTRACT

Digital image processing circuitry clusters a set of images into a set of first clusters of images and a set of unclustered images. The set of first clusters are merged, generating a set of second clusters of images. Images in the set of unclustered images are assigned to one of a cluster of the set of second clusters of images and an outlier image cluster. The clustered images may be partitioned into subclusters based on detection of objects in the images.

26 Claims, 8 Drawing Sheets

(56) References Cited

U.S. PATENT DOCUMENTS

| | | | | |
|---|---|---|---|---|
| 2007/0036371 | A1* | 2/2007 | Buil | G06F 17/3025 381/312 |
| 2011/0038550 | A1* | 2/2011 | Obrador | G06F 17/30274 382/225 |
| 2011/0044549 | A1* | 2/2011 | Bressan | G11B 27/034 382/225 |
| 2011/0129126 | A1* | 6/2011 | Begeja | G06K 9/00295 382/118 |
| 2012/0075440 | A1* | 3/2012 | Ahuja | G06T 7/11 348/61 |
| 2012/0294540 | A1* | 11/2012 | Sun | G06F 17/30247 382/225 |
| 2012/0328167 | A1* | 12/2012 | Wu | G06K 9/00677 382/118 |
| 2013/0011083 | A1* | 1/2013 | Berkovich | G06F 17/30244 382/305 |
| 2013/0148898 | A1* | 6/2013 | Mitura | G06K 9/62 382/195 |
| 2013/0202205 | A1* | 8/2013 | Liu | G06F 17/30268 382/170 |
| 2014/0229307 | A1* | 8/2014 | Kallumadi | G06Q 30/0601 705/26.1 |
| 2015/0169988 | A1* | 6/2015 | Zhang | G06K 9/6202 382/209 |
| 2016/0232428 | A1* | 8/2016 | Engstrom | G06K 9/6215 |
| 2016/0307068 | A1* | 10/2016 | Pau | G06K 9/6223 |
| 2017/0076178 | A1* | 3/2017 | Cheng | G06K 9/6215 |

OTHER PUBLICATIONS

Andreopoulos et al., "Clustering large software systems at multiple layers," *Information and Software Technology* 49:244-254, 2007.

Arthur et al., "k-means++: The Advantages of Careful Seeding," *Proceedings of the Eighteenth Annual ACM-SIAM Symposium on Discrete Procedures, Society for Industrial and Applied Mathematics*, 2007, 9 pages.

Chen et al., "Residual Enhanced Visual Vectors for On-Device Image Matching," *Conference Record of the Forty Fifth Asilomar Conference Signals, System and Computers*, 2011, 5 pages.

Comaniciu et al., "Mean Shift: A Robust Approach Toward Feature Space Analysis," *IEEE Transactions on Pattern Analysis and Machine Intelligence* 24(5):603-619, 2002.

Ester et al., "A Density-Based Algorithm for Discovering Clusters in Large Spatial Databases with Noise," *KDD-96 Proceedings*, 1996, 6 pages.

García et al., "A Dynamic Approach for Clustering Data," *Signal Processing* 44(2):181-196, 1994. (33 pages).

Italian Search Report, dated Dec. 7, 2015, for Italian Application No. TO20150218, 11 pages.

Jégou et al., "Hamming embedding and weak geometric consistency for large scale image search," *Proceedings of the $10^{th}$ European Conference on Computer Vision: Part 1*, 2008, 15 pages.

Jégou et al., "Aggregating local descriptors into a compact image representation," *Computer Vision and Pattern Recognition*, 2010, 8 pages.

Jégou et al., "Aggregating Local Image Descriptors into Compact Codes," *IEEE Transactions on Pattern Analysis and Machine Intelligence* 34(9):1704-1716, 2012.

Kaufman et al., "Finding Groups in Data—An Introduction to Cluster Analysis," John Wiley & Sons, Inc., pp. 37-50, 1990. (16 pages).

Loureiro et al., "Outlier Detection Using Clustering Methods: a data cleaning application," 2004, 12 pages.

Paschalakis et al., "Test Model 12: Compact Descriptors for Visual Search," Video Subground, International Organisation for Standardisation Organisation Internationale de Normalisation ISO/IEC JTC1/SC29/WG11 Coding of Moving Pictures and Audio, ISO/IEC JTC1/SC29/WG11/N14961, Strasbourg, France, Oct. 2014, 27 pages.

Sivic et al., "Video Google: A Text Retrieval Approach to Object Matching in Videos," *Proceedings of the Ninth IEEE International Conference on Computer Vision (ICCV 2003)*, 2003, 8 pages.

Von Luxburg, "A Tutorial on Spectral Clustering," *Statistics and Computing* 17(4):395-416, 2007. (32 pages).

\* cited by examiner

METHOD OF CLUSTERING DIGITAL IMAGES, CORRESPONDING SYSTEM, APPARATUS AND COMPUTER PROGRAM PRODUCT

BACKGROUND

Technical Field

The present description relates to processing digital images.

One or more embodiments may be used for creating clusters of images, e.g., in managing photo collections/mobile photo collections.

Description of the Related Art

Humans are better are certain tasks than machines. For example, humans can simply look at a set of images and easily and directly sort the images, for example, into images of particular categories (e.g., images of people, of cats, of dogs, of mountains, etc.), images of a same scene, etc. Machines, however cannot so easily sort a set of images. The ability of automatically creating clusters of a set of images may be a desirable option in various applications.

For instance, a user of a mobile phone may take photographs while on vacation and then wish to select the best shots after a travel, e.g., on a per-category basis. A clustering procedure may suggest groups of semantically-related photos and propose to the user to select those held to be the most representative of the set and/or those with the highest quality.

As a further example, in an Internet-based service, the ability of re-organizing large photo datasets uploaded by users in a random manner via remote servers may be a useful option in order to facilitate dataset browsing and search.

A clustering procedure may be useful, e.g., in finding near duplicates photos in a set, helping the user to organize a personal photo collection and/or deleting duplicates.

In a visual search environment, a clustering procedure may facilitate eliminating near-duplicate results so that the most relevant results may be presented to a user.

Fast search times may also represent a desirable feature, possibly with search performed incrementally as the photos are shot to improve system responsiveness.

BRIEF SUMMARY

In an embodiment, a method comprises: automatically clustering a set of images into a set of first clusters of images and a set of unclustered images; automatically merging clusters of said set of first clusters of images to produce a set of second clusters of images; and automatically assigning each image of the set of unclustered images to one of: a cluster of the set of second clusters of images; and a respective outlier image cluster. In an embodiment, the automatically clustering the set of images into the set of first clusters of images comprises: determining for each image of the set of images similarity scores between said image and other images in the set of images; and clustering the images in said set of images to produce the set of first clusters of images based on the similarity scores. In an embodiment, the method comprises: generating a matrix S of similarity scores $s_{ij}$, where $s_{ij}$ represents a similarity score between an image i and an image j of the set of images. In an embodiment, the automatically clustering the set of images into said set of first clusters of images comprises: automatically comparing a similarity score between an unclustered image of the set of images and an image in one of the clusters of the set of first clusters to a similarity threshold value and adding the unclustered image to the one of the clusters of the set of first clusters based on the comparing. In an embodiment, the automatically merging clusters of said set of first clusters of images to produce the set of second clusters of images is based on distances between said clusters in said set of first clusters. In an embodiment, a distance between a pair of clusters of the set of first clusters is an average of distances between images of a first cluster of the pair of clusters and images of a second cluster of the pair of clusters. In an embodiment, the automatically merging clusters of said set of first clusters to produce the set of second clusters includes: automatically comparing a distance score between an unmerged cluster of the set of first clusters and a cluster assigned to one of the clusters of the set of second clusters to a distance threshold value and adding the unmerged cluster to the one of the clusters of the set of second clusters based on the comparing. In an embodiment, the automatically assigning each image of the set of unclustered images comprises: automatically determining distance scores between an image of the set of unclustered images and respective clusters of the set of second clusters and assigning the image of the set of unclustered images based on the determined distance scores. In an embodiment, a distance score between the image of the set of unclustered images and a cluster of the set of second clusters is an average value of distance scores between said image of the set of unclustered images and a set of images in said cluster of said set of second clusters. In an embodiment, the automatically assigning each image of the set of unclustered images comprises: identifying a cluster of the set of second clusters which is closest to the image of the set of unclustered images based on the distance scores between the image of the set of unclustered images and the respective clusters of the set of second clusters: comparing a distance score between the image of the set of unclustered images and the identified cluster of the set of second clusters to an outlier threshold value; and assigning the image of the set of unclustered images to one of the identified cluster of the set of second clusters and the respective outlier image cluster based on the comparing of the distance score between the image of the set of unclustered images and the identified cluster of the set of second clusters to the outlier threshold value. In an embodiment, the method comprises: detecting objects in images of the set of images; setting respective object flags of images in the set of images based on the detecting; and partitioning the set of second clusters and the outlier image clusters into sub-clusters based on the respective object flags of the images.

In an embodiment, a system comprises: one or more memories; and digital image processing circuitry, which, in operation: clusters a set of images into a set of first clusters of images and a set of unclustered images; merges clusters of said set of first clusters of images, producing a set of second clusters of images; and assigns each image of the set of unclustered images to one of: a cluster of the set of second clusters of images; and an outlier image cluster. In an embodiment, the digital image processing circuitry, in operation: determines for each image of the set of images similarity scores between said image and other images in the set of images; and clusters the images in said set of images into the set of first clusters of images and the set of unclustered images based on the similarity scores. In an embodiment, the digital image processing circuitry, in operation: generates a matrix S of similarity scores $s_{ij}$, where $s_{ij}$ represents a similarity score between an image i and an image j of the set of images. In an embodiment, the digital image processing circuitry, in operation: compares a similarity score between an unclustered image of the set of images and an image in one of the clusters of the set of first clusters to a similarity threshold value and selectively adds the unclustered image to the one of the clusters of the set of first clusters based on the comparing. In an embodiment, the merging clusters of said set of first clusters of images is based on distances between said clusters in said set of first clusters. In an embodiment, a distance between a pair of clusters of the set of first clusters is an average of distances between images of a first cluster of the pair of clusters and images of a second cluster of the pair of clusters. In an embodiment, the merging clusters of said set of first clusters comprises: comparing a distance score between an unmerged cluster of the set of first clusters and a cluster assigned to one of the clusters of the set of second clusters to a distance threshold value and selectively adding the unmerged cluster to the one of the clusters of the set of second clusters based on the comparing. In an embodiment, the assigning each image of the set of unclustered images comprises: determining distance scores between an image of the set of unclustered images and respective clusters of the set of second clusters and assigning the image of the set of unclustered images based on the determined distance scores. In an embodiment, the assigning each image of the set of unclustered images comprises: identifying a cluster of the set of second clusters which is closest to the image of the set of unclustered images based on the distance scores between the image of the set of unclustered images and the respective clusters of the set of second clusters: comparing a distance score between the image of the set of unclustered images and the identified cluster of the set of second clusters to an outlier threshold value; and assigning the image of the set of unclustered images to one of the identified cluster of the set of second clusters and the respective outlier image cluster based on the comparing of the distance score between the image of the set of unclustered images and the identified cluster of the set of second clusters to the outlier threshold value. In an embodiment, the digital image processing circuitry, in operation: detects objects in images of the set of images; sets respective object flags of images in the set of images based on the detecting; and partitions at least one of the set of second clusters and the outlier image clusters into sub-clusters based on the respective object flags of the images. In an embodiment, the digital image processing circuitry comprises: at least one descriptor generator, which, in operation, generates descriptors of images of the set of images. In an embodiment, the system comprises at least one of: an image capture device, which, in operation, generates digital images of the set of images; and a display, which, in operation, displays one or more images based on the clustering.

In an embodiment, a device comprises: at least one descriptor generator, which, in operation, generates descriptors of images of a set of images; and digital image processing circuitry, which, in operation: clusters a set of images into a set of first clusters of images and a set of unclustered images based on the generated descriptors; merges clusters of said set of first clusters of images, producing a set of second clusters of images; and assigns each image of the set of unclustered images to one of: a cluster of the set of second clusters of images; and an outlier image cluster. In an embodiment, the digital image processing circuitry, in operation: determines for each image of the set of images similarity scores between said image and other images in the set of images based on the generated descriptors; and clusters the images in said set of images into the set of first clusters of images and the set of unclustered images based on the similarity scores. In an embodiment, the merging clusters of said set of first clusters of images is based on distances between said clusters in said set of first clusters.

In an embodiment, a non-transitory computer-readable medium's contents configure digital image processing circuitry to perform a method, the method comprising: clustering a set of images into a set of first clusters of images and a set of unclustered images; merging clusters of said set of first clusters of images, producing a set of second clusters of images; and assigning each image of the set of unclustered images to one of: a cluster of the set of second clusters of images; and an outlier image cluster. In an embodiment, the method comprises: determining for each image of the set of images similarity scores between said image and other images in the set of images; and clustering the images in said set of images into the set of first clusters of images and the set of unclustered images based on the similarity scores. In an embodiment, the set of unclustered images is an empty set.

One or more embodiments may relate to a method of organizing images, a corresponding system, a corresponding apparatus including, e.g., a digital image capture device to produce digital images for processing by such a system and/or a display device for displaying the resulting images, as well as to a computer program product loadable in the memory of at least one computer and including software code portions for executing the steps of the method of one or more embodiments when the product is run on at least one computer. As used herein, reference to such a computer program product is understood as being equivalent to reference to a computer-readable medium containing instructions for controlling the processing system in order to co-ordinate the implementation of the method according to one or more embodiments. Reference to "at least one computer" is intended to highlight the possibility for one or more embodiments to be implemented in modular and/or distributed form.

One or more embodiments may involve a clustering procedure of images (e.g., photos) using global visual descriptors.

One or more embodiments may involve starting from an unorganized set of photos and grouping these photos in a dynamic number of clusters of similar elements by using a visual search method.

The number of clusters being "dynamic" means that, rather than being a static parameter (e.g., user defined), the number of clusters may be defined by the clustering method at run time.

One or more embodiments may provide a method having a low complexity.

BRIEF DESCRIPTION OF THE SEVERAL VIEWS OF THE FIGURES

One or more embodiments will now be described, purely by way of non-limiting example, with reference to the annexed figures, wherein.

DETAILED DESCRIPTION

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Various documents will be referred to throughout this detailed description of one or more embodiments.

These documents are included in a List of Documents at the end of the description. Each document is identified in the list by a number between square parentheses (e.g., [X]) and will be cited in the description by referring to that number. The listed documents are incorporated herein by reference.

As already mentioned by way of example, a user of a mobile phone may take photographs while on vacation and then wish to select the best shots after a travel on a per category basis. A clustering procedure may suggest groups of semantically-related photos and propose to the user to select those held to be most representative of the set and/or those with the highest quality.

Similarly, in an Internet-based service, the ability of re-organizing large photo datasets uploaded in a random manner by users on remote servers may be a useful option in order to facilitate dataset browsing and search.

In applications as exemplified in the foregoing a clustering procedure may be useful, e.g., in finding the near duplicates photos in a set, in helping the user to organize a personal photo collection, or just in deleting duplicates. In a visual search environment a clustering procedure may facilitate eliminating near-duplicate results so that the most relevant results may be presented to a user.

Image processing systems implementing one or more embodiments as exemplified in the following lend themselves to being incorporated in a variety of devices including, e.g., cameras, smartphones, tablets, personal computers and, more generally, any apparatus running application software involving clustering of images.

Figure 1:
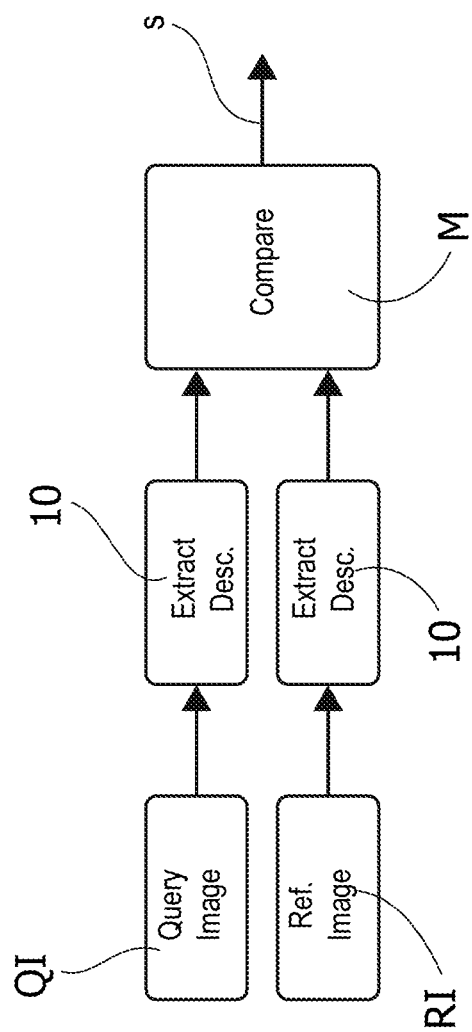
FIGS. 1 and 2 are functional block diagrams that illustrate exemplary processing of images based upon descriptors.
Figure 2:
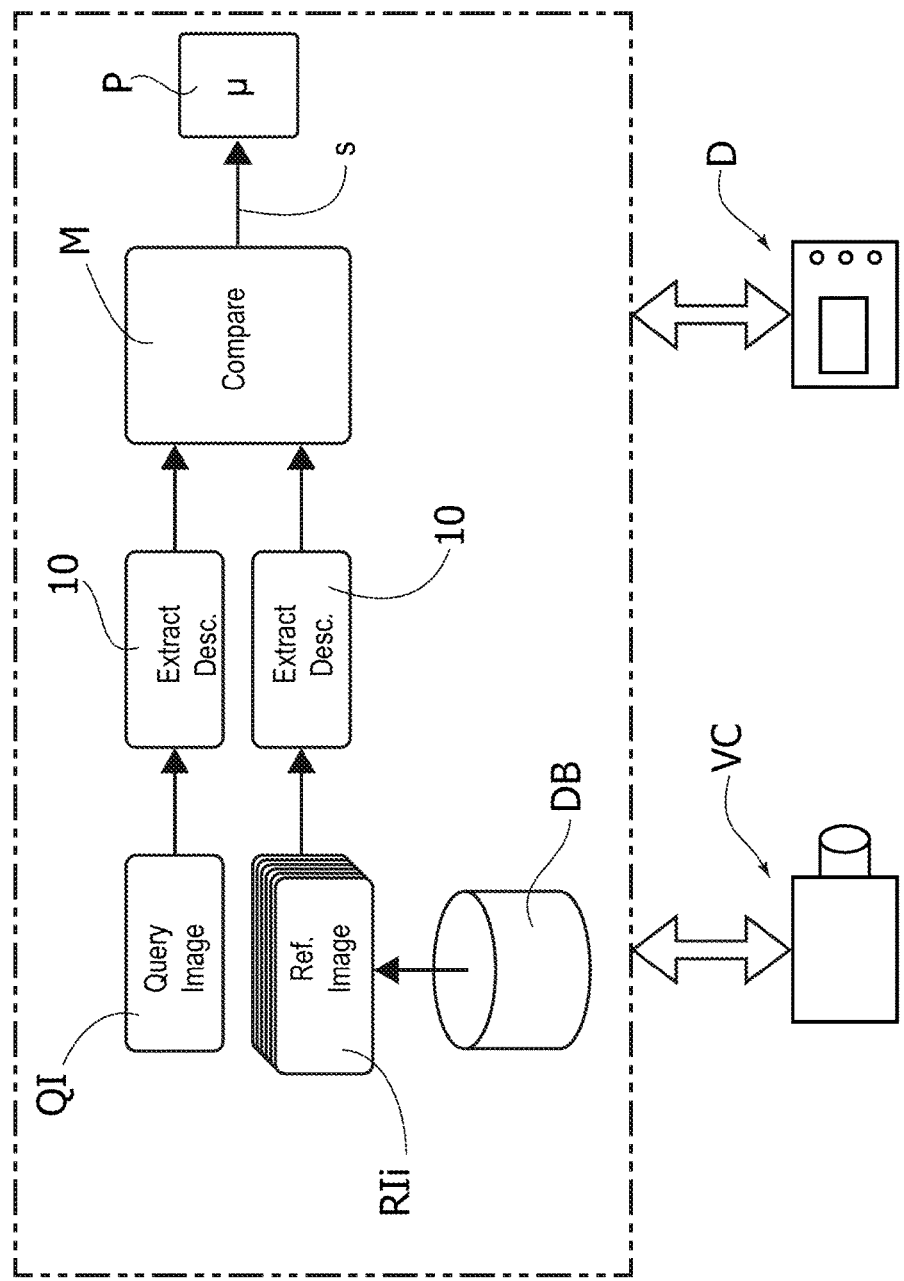

FIGS. 1 and 2 are block diagrams exemplary of functional architectures for performing pair-wise matching or retrieval (searching) M of digital images, e.g., digital photos.

Photo collections/mobile photo collections may take advantage of such an architecture in those applications where clusters of a set of images are built.

For instance, a matching function/module M as exemplified in FIG. 1 may make it possible to verify in an automated way (for example, via a computer or processor possibly included in a camera or a mobile device such as a smartphone or a tablet including a camera) whether two images, that is two photos, represent the same objects or the same scene, or, more generally semantically-related entities (e.g., for proposing most representative images, discarding duplicates and so on).

This result may be achieved by operating on a query image QI and on a reference image RI. For that purpose, both the images may be subjected to an operation of extraction of descriptors (which is designated as a whole by 10) and to an operation of comparison performed at M by operating on these descriptors as extracted at 10, the comparison being aimed at detecting a possible matching. The result of the matching operation, designated by R, may take the form of a similarity score s. Such a similarity score s may indicate whether the query image QI represents or not the same objects, the same scene or, more generally, a semantically-related entity, namely "matches" the reference image RI.

The retrieval function of FIG. 2 may operate according to the same criteria save that, in the case of retrieval, the comparison at M is made with a number of reference images $RI_i$ extracted from a data base DB. In that way, it is possible to generate a set of similarity scores $s_{ij}$, and, based thereon, search and retrieve within the data base DB one or more images that reproduce the same objects, the same scene or, more generally, a semantically-related entity as the query image QI.

Such a function may permit to re-organize large photo databases DB (datasets) produced by users uploading their images such as, e.g., photos on remote servers in a random manner in order to facilitate dataset browsing and search.

Just by way of non-limiting example, FIG. 2 refers to a system which may include, in addition to a processor P configured to process similarity scores $S_{ij}$ as better detailed in the following, either or both of:
- an image capture device VC (e.g., a camera) to produce images such as photographs to populate the data base DB; and/or
- a display device D such as a screen to display the images (photos) resulting from the image clustering process according to one or more embodiments as exemplified herein.

One or more embodiments as exemplified herein may include processing circuits (see, e.g., FIG. 8) adapted to be structured, e.g., as a processing pipeline for extracting features from a image signal to produce compact descriptors CD of digital images I (e.g., digital video frames). Such descriptors may include, in addition to a certain number of local descriptors LD, a single global descriptor GD referring to the image as a whole.

As used herein, the term image includes still images (e.g., photos) as well as frames in a video sequence. In the context of the instant disclosure, video thus covers also, e.g., still images/pictures, 2D video stream, and 3D video stream, e.g., 2D video plus depth for each image, such as an additional matrix of same size of the image which may contain per-pixel depth information. Similarly, while three matrixes may contain video pixel information on "Y", "U" and "V" components, per time frame, other color spaces, such as equivalent color spaces, may be used in one or more embodiments.

Extracting features/descriptors of images and computing similarity scores therebetween may take place in any manner known in the art for that purpose, which makes it unnecessary to provide a detailed description herein.

In that respect, those of skill in the art will appreciate that one or more embodiments herein deal with how such images may be clustered irrespective of the specific way these similarity scores may be calculated, which may occur in any known manner.

For instance, the MPEG standard CDVS (see, section 1 in [1]) proposes a visual search procedure wherein three blocks of information are extracted from an image and stored in a compact bitstream.

These information blocks may include:
- a global visual descriptor GD, that is, a signature of the whole image allowing fast pairwise comparisons between a high number (possibly millions) of images in a large visual database DB (see, e.g., FIG. 2);
- coordinates of interest points, extracted with a detector (e.g., LoG, Laplacian of Gaussian as provided in the MPEG CDVS standard) in an image;
- local visual descriptors CD extracted with a feature extraction procedure (e.g., SIFT—Scale Invariant Feature Transform as provided in the MPEG CDVS standard) in order to achieve an invariant representation of the image with respect to changes in lighting, point of view, etc.

In a Visual Search procedure designated Video Google as proposed by Sivic et al. [2], the local descriptors extracted from an image are quantized to visual words (e.g., with a K-means procedure [8] and the image represented by a histogram of words (Bag of Words, BoW). That procedure has been improved by replacing the visual words with more efficient and compact binary codes, as in the case of Hamming Embedding [3], these methods being otherwise computationally intensive.

Global descriptors have been proposed as a means for alleviating the long matching times of BoW models, based on a signature computed from local descriptors. The Vector of Locally Aggregated Descriptors (VLAD) [4] learns as in the case of BoW a codebook of visual words, and then encodes the residual quantization vector with product quantization. Locality Sensitive Hashing (LHS) is used for retrieval.

Residual Enhanced Visual Vectors REVV [5] introduces an improved dimensionality reduction and encoding scheme to VLAD and Fisher Vectors [6] replace the hard assignment to a visual word with a soft assignment to a number of neighboring visual words in order to further improve matching performances.

In image clustering a collection of images may be organized into groups based on similarity. At least two types of clustering procedures are discussed in the literature [7]: partitioning and hierarchical procedures.

Partitioning procedures divide a set of N objects in K clusters; these procedures may involve starting with an initial partition and then dynamically changing the partitions by optimizing an objective function.

Partitioning procedures may include the K-means procedure [8], already mentioned in the foregoing, the Mean Shift clustering procedure [9], the Spectral Clustering procedure [10] and the DBSCAN procedure [11].

Hierarchical procedures create a hierarchical decomposition of an initial set. This is represented by a "dendrogram", that is a tree that iteratively splits the set into smaller subsets until each subset contains only one object. Each node of the tree is a cluster. A typical hierarchical clustering procedure is the one referred to as Ejcluster [12].

More in detail:
- the K-Means clustering procedure is a widely used clustering technique that seeks to minimize the average squared distance between points in the same cluster. This procedure may involve an a priori definition of a number k of centroids/clusters; moreover, it is limited to $L^2$ distances, and thus is not applicable to different distance measures (e.g., Hamming);
- the Mean Shift clustering procedure aims at discovering blobs in a smooth distribution of samples. It may be regarded as a centroid-based procedure, which operates by updating candidates for centroids to be the mean of the points within a certain region. These candidates may then be filtered in a post-processing stage to eliminate near-duplicates to form the final set of centroids. This again may involve a priori definitions of the centroids/clusters;
- the Spectral Clustering technique aims at finding a low-dimension embedding of the affinity matrix between samples, followed by a K-means pass in the low dimensional space. As the two methods discussed previously, this involves specifying the number of clusters to be found;
- in the DBSCAN procedure, clusters are viewed as areas of high density separated by areas of low density. Because of the non-centroid view, the clusters found by DBSCAN can be any shape, as opposed to k-means which assumes that clusters are convex shaped. A key element of the DBSCAN is the concept of core samples, that is those samples that are in areas of high density. A cluster is therefore a set of core samples, close to each other (measured by some distance measure) and a set of non-core samples that are close to a core sample (but are not themselves core samples). A drawback of this method is the definition of two parameters that define the density criteria used to form the clusters;
- hierarchical procedures may be unable to satisfy the requirements for image clustering since defining a hierarchy between different clusters may not be necessary. Moreover, these procedures rely on the definition of a termination condition indicating when the merge or division process should be terminated [11].

The procedure known as Ejcluster addresses such an issue [12] at the cost of a high complexity.

Starting from the scenario depicted in the foregoing, one or more embodiments as presented herein rely on the concept of using a set of similarity scores to build image clusters.

A way to compute similarity is for example the similarity measure between quantized Fisher Vectors as reported in Section 3.1 of [1]. According to such an exemplary approach, starting from the SIFT descriptors in the image, the dimensionality of the descriptors is first reduced by means of Principal Component Analysis; given a Gaussian Mixture Model (GMM) trained on an exemplar set of SIFT descriptors, the derivative with respect to the GMM parameters in the points corresponding to the SIFT descriptors represent the un-quantized Fisher Vector; the components of the Fisher Vector are then set to 1 if they exceed a threshold $THR_{FV}$ and 0 otherwise. The similarity is computed as a function of the Hamming distance between Fisher Vectors, where lower Hamming distance is mapped to higher similarity.

An underlying principle of one or more embodiments may be to exploit the similarity scores between images in order to determine if one image may be included in a cluster of similar images or not.

In one or more embodiments, clustering may be performed in three stages:

a first set of candidate micro clusters (first clusters) are created from the database images, and any images not ascribed to any cluster together with other images (e.g., those images possibly forming a one-image cluster) are considered as outliers;

the first candidate clusters are merged to form a second set of macro clusters (second clusters);

any outliers are assigned to the closest second cluster (e.g., a cluster in said second set to which an outlier image has a highest similarity score) or, alternatively, may give rise to their own cluster(s).

In one or more embodiments as disclosed herein, a similarity score between two images may be computed in a fast manner, with low complexity by using a global descriptor as defined in the CDVS standard (section 3.1 in [1]).

This facilitates, in one or more embodiments, providing fast search times such as, e.g., 0.23 s as well as clustering times of, e.g., 0.02 s for 114 images.

In one or more embodiments, a clustering procedure may involve:

computing a similarity matrix between all pairs of images in a database;

building micro clusters from the similarity matrix, e.g., by operating in a so-called greedy fashion;

merging the micro clusters, e.g., by operating again in a greedy fashion to form the macro clusters;

adding the outliers to the macro clusters and generating final clusters.

One or more embodiments may involve using additional discriminative signals to split the final clusters based on image content.

Possible exemplary embodiments will now be described with reference to FIGS. 3 to 8.

Figure 3:
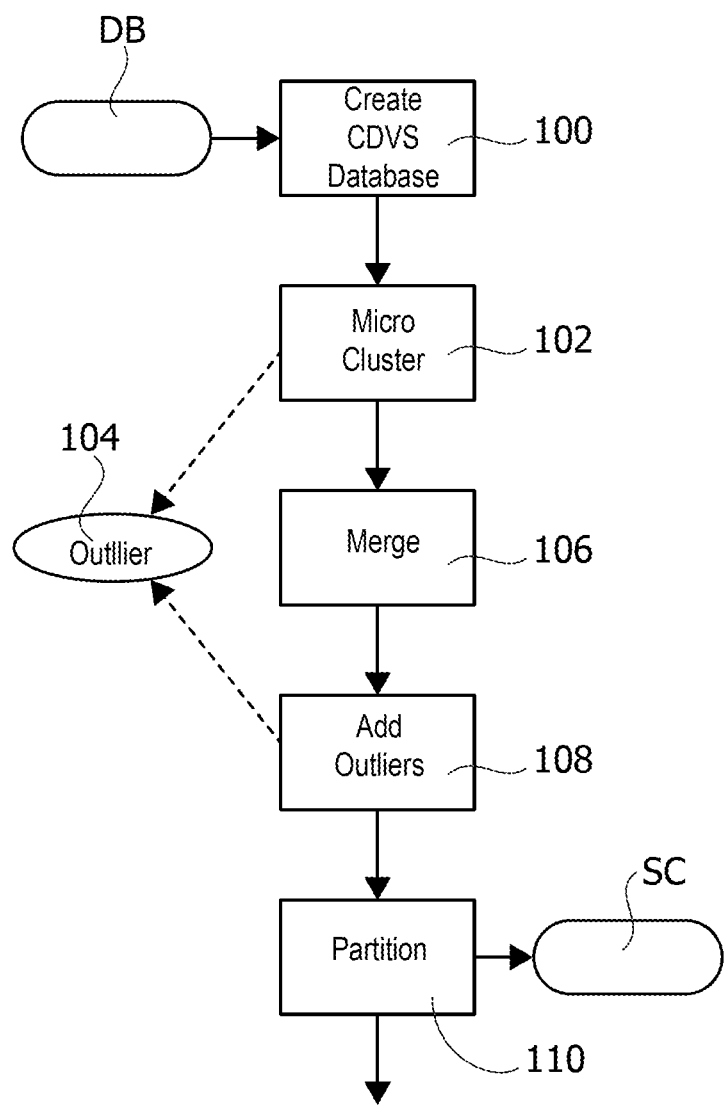
FIG. 3 is a functional block diagram of exemplary embodiments.

By referring first to FIG. 3, a data base DB of images (e.g., photos) may be assumed to include, e.g., N images.

In a step 100 a Global Descriptor (GD) database is created from the images in the input database DB. In one or more embodiments, this may occur in any known manner for that purpose, e.g., by resorting to the CDVS extraction procedure as exemplified in Section 2 of [1].

The MPEG standard CDVS proposes a visual search procedure wherein three blocks of information are extracted from an image and stored in a compact bitstream.

One of these blocks is a global visual descriptor GD, that is, a signature of the whole image.

Other blocks include the coordinates of interest points and local visual descriptors CD extracted with a feature extraction procedure on the image invariant with respect to changes in lighting, point of view, etc.

In one or more embodiments, creating the CDVS (Compact Descriptors for Visual Search) database from the images in the input database DB in step 100 may involve resorting to the CDVS extraction procedure limited to the generation of the global descriptor (GD), which is a fast visual search system.

In one or more embodiments, given a query image QI (see, e.g., FIGS. 1 and 2 for general reference) and a set of CDVS global descriptors packed in a CDVS database, the possibility exists of calculating a similarity score between each query image and each of the images in the database (see, e.g., the query image QI and the images RE in FIG. 2 by way of reference).

In one or more embodiments, the step 100 may also include applying, e.g., a CDVS retrieval engine to perform a search in the database DB by using each image in the database as the query image QI.

In that way, the possibility exists of producing (e.g., calculating) for each image a corresponding set of similarity scores between:

the image in question, and all the other images in the database DB.

The set of scores may take the form of a matrix S where each element $$[S]_{ij} = s_{ij}, j=1,N$$

is the similarity score between the i-th image and the j-th image in the database.

It will be appreciated that while in the exemplary case of CDVS, the similarity matrix S may be symmetric, procedures other than CDVS may be used where similarity may not be strictly symmetric, that is $s_{ij} \neq s_{ji}$ in the general case.

In a step 102, first micro clusters of images may be created.

In one or more embodiments, this may involve scanning the similarity matrix S row by row and building the micro clusters using a fast greedy procedure: e.g., given an image $X_i$ not included in a cluster yet, a new micro cluster $C_m$ is created and the image is put in that cluster.

Then the images along the i-th row (or column) in the matrix may be scanned, and another image $X_j$ added to the micro cluster if that image has not yet been added to another micro cluster and if the similarity score to the image $X_i$ reaches (e.g., is higher than) a similarity threshold value (e.g., THR1) indicating that the two images have a certain degree of similarity with each other.

If, at the end of the scanning, a micro cluster has only one image, then that single image is regarded as an outlier and included in a special set, called the outlier set: the block labelled 104 in FIG. 3 is exemplary of such a step.

It will be appreciated that in certain circumstances, e.g., depending on the nature of the images processed, the outlier set (the set of outlier images) may turn out to be an empty set. That may be the case when no outlier image results from the process leading to creating the set of micro clusters.

It will otherwise be appreciated that images possibly included in a micro cluster having only one image (the outlier images) can be regarded as de-facto excluded from the clustering process insofar as they are not clustered with any other image.

Figure 4:
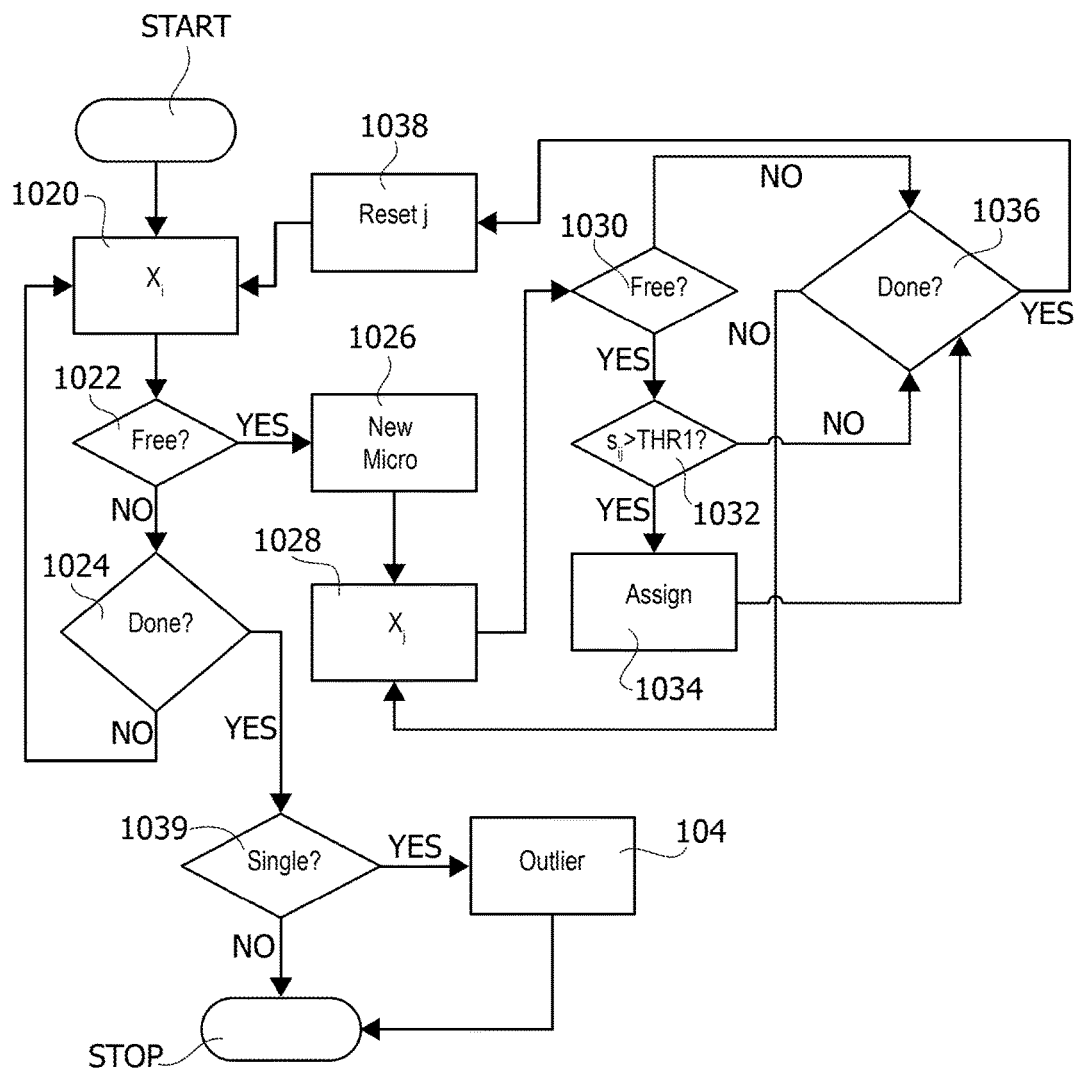
FIGS. 4 to 7 are flow charts exemplary of processing in embodiments.

The flow chart of FIG. 4 provides additional detail of an exemplary implementation of the processing just described in one or more embodiments.

After a START step, a sequence of steps may include:

1020: an image $X_i$ with index i is considered;

1022: a check is made as to whether the image $X_i$ considered is free, that is not already assigned to a micro cluster;

1024: if the image considered is not free, e.g., it has been already assigned to a micro cluster, a check is made as to whether all images were considered. If not, index i is incremented and a new image is considered in step 1020;

1026: a new micro cluster is created for the image found to be free in step 1022 and the image is assigned to the newly formed cluster;

1028: following either step 1026 or a negative outcome of step 1036 (see below) a jump is made to another image $X_j$ with index j in the i-th row (or column) of S;

1030: a check is made as to whether the image $X_j$ considered is free, that is not already assigned to a micro cluster;

1032: if the image $X_j$ is found to be free in step 1030 the similarity score $s_{ij}$ between the image $X_i$ and the image $X_j$ is calculated; a check is made as to whether the similarity score reaches (e.g., is above) a threshold, e.g., THR1;

1034: following a positive outcome of step 1032 (that is the similarity score $s_{ij}$ between the image $X_i$ and the image $X_j$ reaches the threshold THR1) the image $X_j$ is assigned to the same micro cluster of image $X_i$;

1036: following any of a negative outcome of step 1030 (the image Xj is not free), a negative outcome of step 1032 (the similarity score $s_{ij}$ between the image $X_i$ and the image $X_j$ does not reach the threshold THR1) or the step 1034, a check is made as to whether a jump has taken place to all the images $X_j$ in the same row/column of image $X_i$;

1038: following a positive outcome of step 1036 the jumping memory for index j is reset;

1039: following a positive outcome of step 1024, i.e., all images have been considered, a check is made as to whether any micro clusters including only one image are present;

104: as a result of a outcome in step 1039 these one-image clusters are deleted and any images therein are incorporated to the outlier set.

The system finally evolves to a STOP state after either a negative outcome of step 1039 (no "one-image" clusters to be assigned to the outlier set) or the step 104.

In one or more embodiments, a distance function F1 can be produced between an image $X_i$ and a cluster $C_m$, returning an (image) distance score $d_{im}$, e.g.:

$$d_{im} = F1(X_i, C_m)$$

By way of non-limiting example, that distance may be calculated as the mean (average) of the similarity scores between the image $X_i$ and each image (or a subset of the images) in the cluster $C_m$, e.g.:

$$d_{im} = \frac{1}{N} \sum_{j \in C_m} s_{ji}$$

It will be appreciated that, while termed a distance function, a function such as $d_{im}$ may in fact represent a closeness function insofar as it may have higher values as the similarities $s_{ij}$ are higher.

In one or more embodiments, a second distance (e.g., closeness) function between two clusters $C_m$ and $C_n$ may be defined, returning a (cluster) distance score $D_{mn}$.

By way of non-limiting example, the distance $D_{mn}$ may be calculated as the mean (average) of the values returned by the function F1 using as an input the images in the cluster $C_m$ and the cluster $C_n$, respectively.

$$D_{mn} = F2(C_m, C_n) = \frac{\sum_{X_u \in C_m} F1(X_k, C_m) + \sum_{X_u \in C_m} F1(C_n, X_u)}{|C_m| + |C_n|}$$

That is, in one or more embodiments, given a pair of clusters $C_m$, $C_n$ in the first set of micro clusters created by clustering the images in the data base DB, the distance score $D_{mn}$ between clusters $C_m$, $C_n$ may be calculated as an average value of distance values calculated between the images included in one of the clusters in the pair (e.g., $C_m$) $C_n$ and the images included in the other cluster in the pair (e.g., $C_n$).

Again, to speed up the procedure and decrease the computational cost, the function F2 may receive as input a scalar parameter n that, by way of non-limiting example, limits the calculation of the mean F1 distances to a set of images which is a subset (e.g., the first n images) of the whole set of images in each cluster.

Similarly to what has been done previously with the images $X_i$ or $X_j$ a micro cluster that has not been merged with another "micro" cluster yet may be defined to be free.

In one or more embodiments a greedy procedure may again be applied to the micro clusters, e.g., $C_m$, $C_n$: starting from a first micro cluster Cm which is free a distance score given by the function F2 to any other free micro cluster $C_n$ may be calculated. If the distance score thus calculated reaches a distance threshold value (e.g., THR2), indicating that the two clusters have a certain degree of "closeness" or "vicinity" to each other, the two micro clusters may be merged 106 into a macro cluster.

Figure 5:
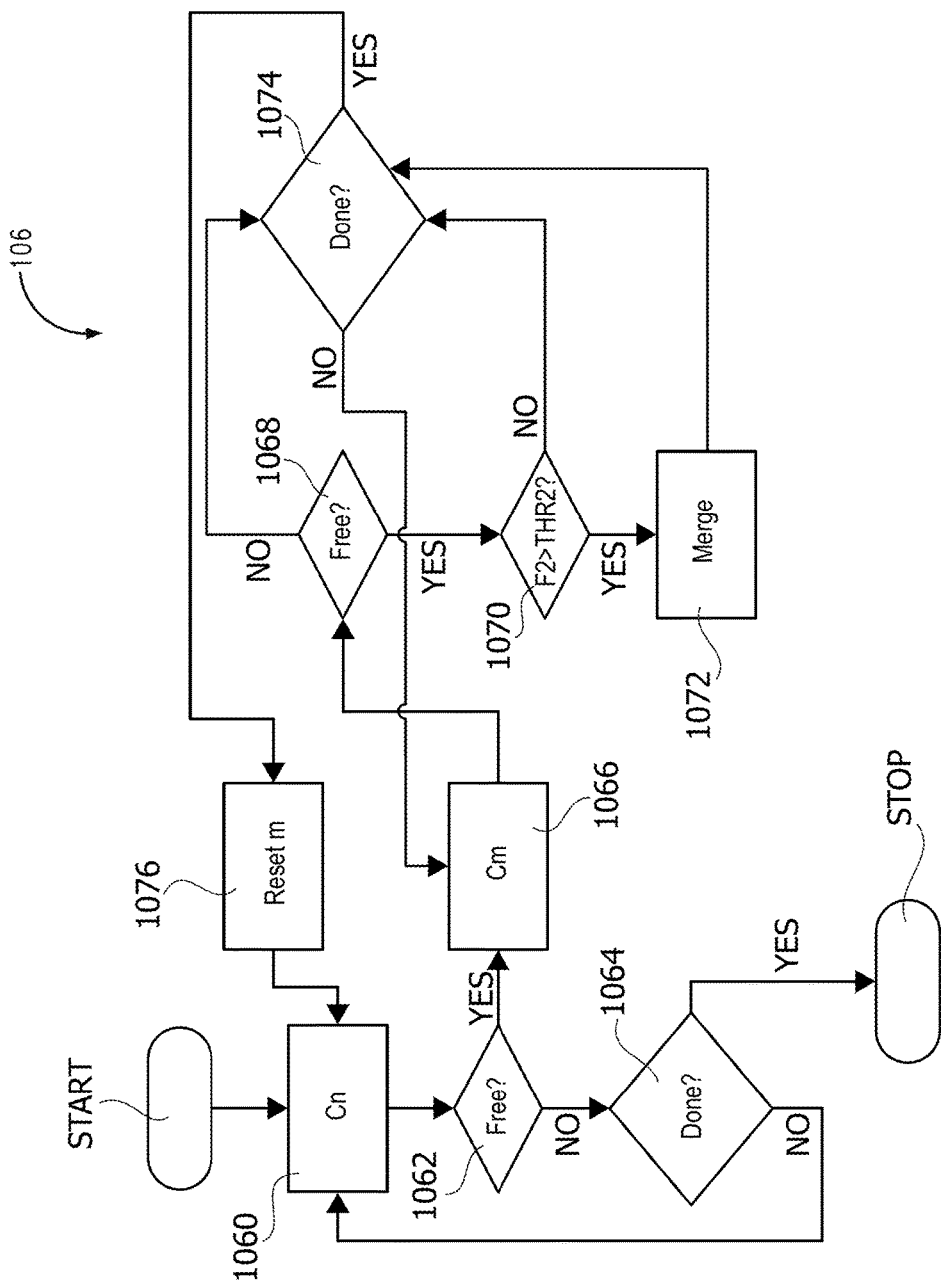

The flow chart of FIG. 5 provides additional detail of an exemplary implementation of the merge processing 106 just described in one or more embodiments.

After a START step, a sequence of steps may include:

1060: a micro cluster $C_n$ with index n is considered;

1062: a check is made as to whether the micro cluster $C_n$ is free, that is not already merged with another micro cluster;

1064: if the micro cluster considered is not free, that is it has been merged with another micro cluster, a check is made as to whether all clusters were considered. If not, index n is incremented and a new "micro" cluster is considered in step 1060;

1066: if the micro cluster considered $C_n$ is free a jump is made to another micro cluster $C_m$ with index m;

1068: a check is made as to whether the micro cluster $C_m$ is free;

1070: if the micro cluster $C_m$ is found to be free, in step 1068 the function $F2(C_n, C_m)$ is calculated for the micro clusters $C_n$ and $C_m$ and a check is made as to whether the function F2 reaches a threshold e.g., THR2;

1072: following a positive outcome of step 1032 (that is the function F2 for the micro clusters $C_n$ and $C_m$ reaches a threshold the threshold THR2) the micro clusters $C_n$ and $C_m$ are merged;

1074: following any of a negative outcome of step 1068 (the micro cluster $C_m$ is not free), a negative outcome of step 1070 (the function F2 for the micro clusters $C_n$ and $C_m$ does not reach the threshold THR2) or the step 1072, a check is made as to whether a jump has taken place to all the micro clusters $C_m$ possibly candidate to be merged with $C_n$;

1076: following a positive outcome of step 1074 the jumping memory for index m is reset.

Following a positive outcome of step 1064, e.g., all micro clusters possibly adapted to be merged with one another have been considered the system finally evolves to a STOP state.

The images in the outliers set created in step 104 may then be added to the clusters resulting from the merging process just described in connection with FIG. 5.

In one or more embodiments, this may involve calculating for each image in the outlier set a distance (e.g., closeness) score F1 from the image to each macro cluster produced by merging micro clusters and exemplified in connection with FIG. 5. If the (peak) distance reaches a given threshold (e.g., THR3), indicating that a certain macro cluster is the closest to the image, the image is added to that cluster. Otherwise, a separate new cluster may be created for that outlier image.

Figure 6:
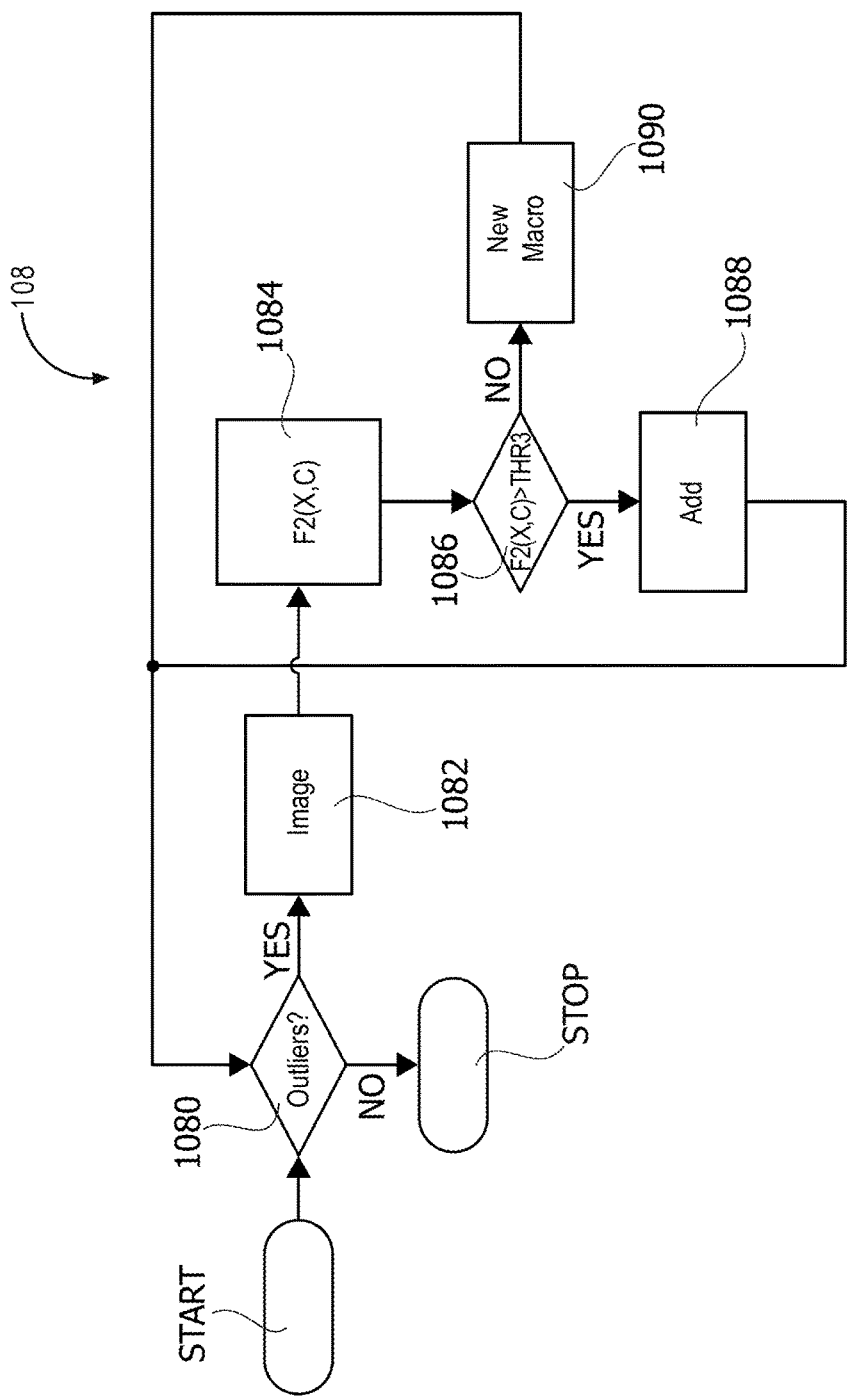

The flow chart of FIG. 6 provides additional detail of an exemplary implementation 108 of such processing in one or more embodiments.

After a START step, a sequence of steps may include:

1080: a check is made as to whether any images are present in the set created in step 104; if no such images are present (that is, no outliers present) the system evolves to a STOP state;

1082: if any images are present in the set created in step 104, an image is picked up and removed from the set;

1084: the function F2(X,C) is calculated for the image picked up and all the macro clusters created by merging the micro clusters; the peak value calculated by cycling over all the macro clusters is returned;

1086: a check is made as to whether that peak value reaches a threshold, e.g., THR3;

1088: following a positive outcome of step 1086 the image picked up is added to the closest macro cluster C for which the peak for the function F2(X,C) has been calculated; the system evolves back to step 1080 so that any other outlier image possibly present may be picked up and removed from the outlier set in step 1082;

1090: following any of a negative outcome of step 1068 (the peak value for the function F2(X, C) does not reach the threshold THR3, indicating than no macro cluster reasonably close to the image exists) then a new respective macro cluster is created for that image X; the system evolves back to step 1080 so that any other outlier image possibly present may be picked up and removed from the outlier set in step 1082.

A CDVS global descriptor (GD) may represent a fast and robust metrics to determine if two images are globally similar or not.

When paired with the proposed clustering procedure, it may lead to including in the same cluster certain images with the same background but with different, localized details.

In order to increase discriminability, one or more embodiments may include using a discriminative signal, where, e.g., a Histogram of Gradient (HoG) object detector or a Deep Learning classifier or a face detector/identifier may be used to split the input (macro) clusters based on the discriminative signal, e.g., based on the fact that a person is in the clustered image.

In one or more embodiments, this may involve defining a list of object classes to be detected (e.g., cars, people, dogs may be exemplary of some such classes).

For each image in a cluster, the defined objects may be detected when setting up the database DB. A positive detection may be indicated by setting (e.g., to "1") a bit flag in the position relative to the object class. In the case of no detection the same flag may be set, e.g., to "0".

These flags may then be collected in a binary word ("signature") and for each value of the signature a subcluster may be created collecting the images with a same signature.

For instance, if the CDVS procedure of Section 2 of [1] is used, a global descriptor GD may permit the clustering procedure, and thus a simplified version of the descriptor can be used as exemplified in Table 1 below.

TABLE 1

| Modified CDVS bitstream | |
|---|---|
| CDVS Descriptor { | Number of bits |
| VersionID | 3 |
| GlobalHasBitSelection | 1 |

TABLE 1-continued

| Modified CDVS bitstream | |
|---|---|
| CDVS Descriptor { | Number of bits |
| GlobalHasVariance | 1 |
| <Global descriptor encoding> | <variable> |

In one or more embodiments, the database may be modified, in order to include only the global index and avoid the geometric re-ranking step, as the latter is performed by using only the information on local descriptors.

Figure 8:
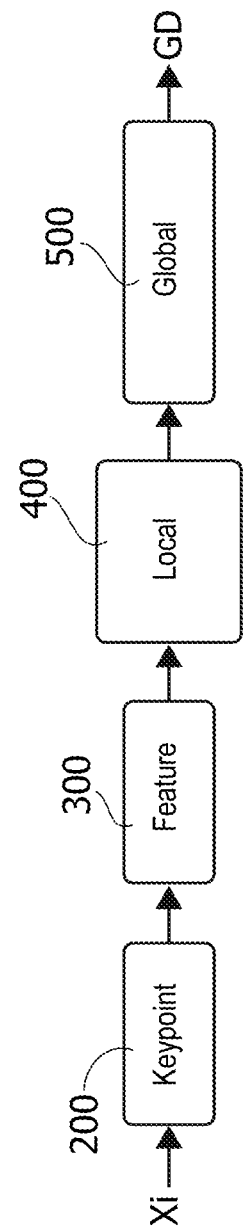
FIG. 8 is a block diagram of a descriptor extractor according to an embodiment.

As schematically represented in FIG. 8, in one or more embodiments, a modified CDVS extractor may then include a feature (keypoint) detection module 200, a feature selection module 300 and a descriptor generation section including, e.g., a local descriptor computation module 400 and a global descriptor aggregation (e.g., encoding module 500.

Figure 7:
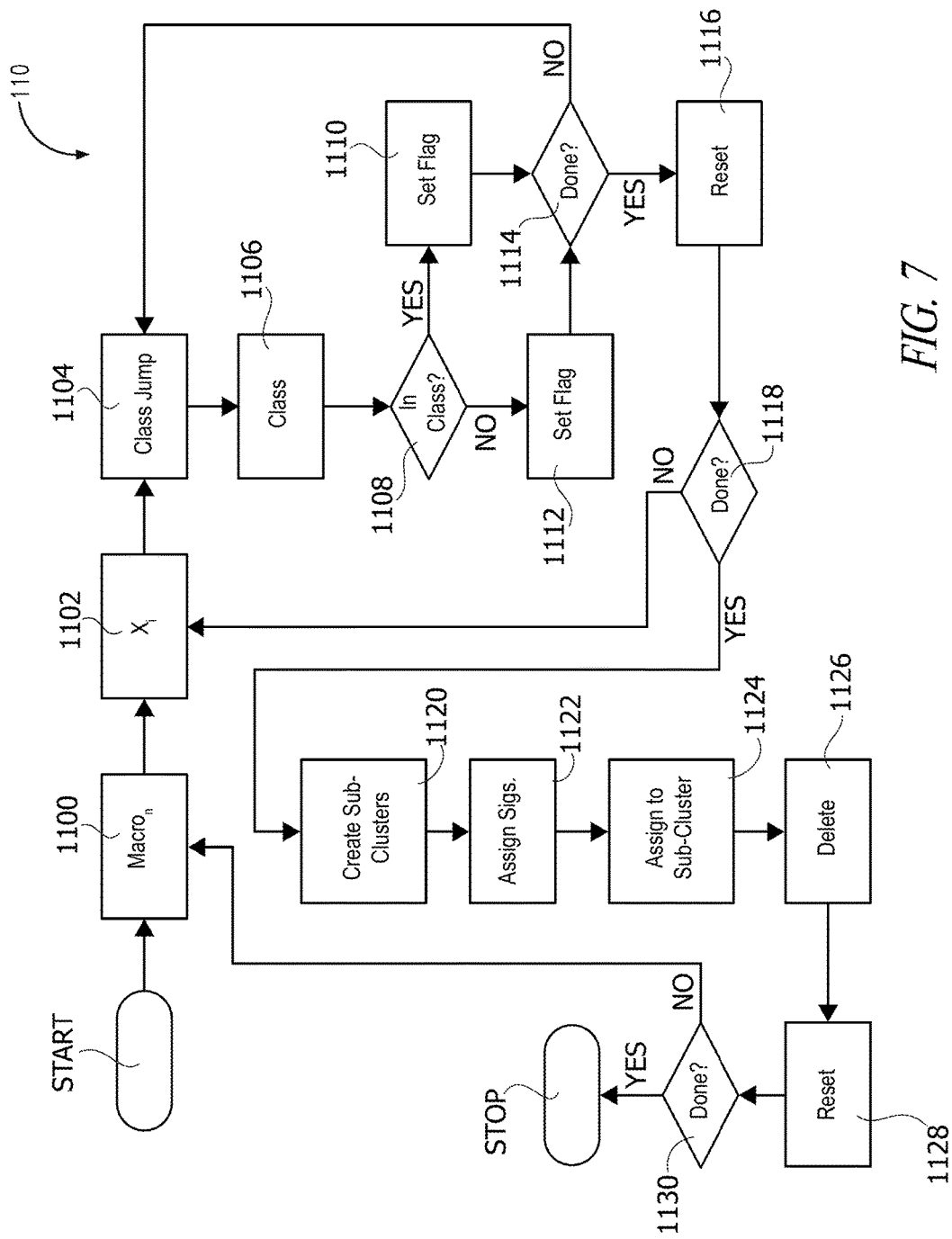

The flow chart of FIG. 7 provides additional detail of an exemplary implementation of the discrimination 110 processing just described in one or more embodiments.

After a START step, a sequence of steps may include:

1100: a macro cluster with index n is considered;

1102: a jump is made to a (next) image with an index i;

1104: a jump is made to a (next) class detector: cars, people, dogs may be exemplary of some such classes for which detectors may be defined (in a manner known per se);

1106: a class CL is detected for an image i in cluster n;

1108: a check is made as to whether detection is positive;

1110: if the detection as checked in step 1108 is positive a respective signature (e.g., a flag "1") is written for the image i in the relative position in the cluster n;

1112: if the detection as checked in step 1108 is negative a respective signature (e.g., a flag "0") is written for the image i in the relative position in the cluster n;

1114: irrespective of whether writing "1" (step 1110) or "0" (step 1112) a check is made as to whether all the classes for image i have been cycled through; in the negative, processing cycles back to step 1104 to jump to a new class;

1116: following a positive outcome of step 1114 the jumping memory for index C is reset;

1118: a check is made as to whether all the images for cluster n have been cycled through; in the negative, processing cycles back to step 1102 to jump to a new image by incrementing the image index i;

1120: following a positive outcome of step 1118, the different signatures are counted and an equal number of subclusters is created;

1122: a signature is assigned to each subcluster created;

1124: all the images that have a signature equal to the one assigned to a subcluster are moved to that subcluster;

1126: the original (empty) subcluster is deleted;

1128: the jumping memory for the image index i and all the signatures is reset;

1130: a check is made as to whether all the original clusters have been cycled through; in the negative, processing cycles back to step 1100 to jump to a new cluster by incrementing the cluster index n.

Following a positive outcome of step 1130 (all the original clusters having been cycled through) the system finally evolves to a STOP state.

In one or more embodiments, splitting into sub clusters may be applied also to the respective outlier image clusters including an outlier which was not clustered to any macro cluster in the process exemplified in FIG. 6.

LIST OF DOCUMENTS

[1] Test Model 12: Compact Descriptors for Visual Search, Strasbourg: ISO/IEC JTC1/SC29/WG11/N14961, October 2014.
[2] J. Sivic and A. Zisserman, "Video Google: a text retrieval approach to object matching in videos," in Proceedings of the International Conference on Computer Vision, 2003.
[3] H. Jegou, M. Douze and C. Schmid, "Hamming embedding and weak geometric consistency for large scale image search," in Proceedings of the 10th European Conference on Computer Vision: Part I, 2008.
[4] C. Schmid and P. Patrick, "Aggregating local descriptors into a compact image representation," in Computer Vision and Pattern Recognition, 2010.
[5] D. Chen, S. Tsai, V. Chandrasekhar, G. Takacs, H. Chen, R. Vedantham and B. Girod, "Residual Enhanced Visual Vectors for on-device image matching," in Conference Record of the Forty Fifth Asilomar Conference on Signals, Systems and Computers, 2011.
[6] H. Jegou, F. Perronnin, M. Douze, J. Sanchez, P. Perez and C. Schmid, "Aggregating local image descriptors into compact codes," in IEEE Transactions on Pattern Analysis and Machine Intelligence, 2012.
[7] K. Leonard and R. Peter J., "Which Clustering Algorithm to Choose", In Finding Groups in Data: An Introduction to Cluster Analysis (pp. 37-50), John Wiley & Sons, 1990.
[8] D. Arthur and S. Vassilvitskii, "k-means++: The advantages of careful seeding," in Proceedings of the eighteenth annual ACM-SIAM symposium on Discrete procedures, Society for Industrial and Applied Mathematics, 2007.
[9] C. Dorin and M. Peter, "Mean shift: A robust approach toward feature space analysis," in IEEE Transactions on Pattern Analysis and Machine Intelligence, 2002.
[10] Von Luxburg, U. (2007). A tutorial on spectral clustering. Statistics and Computing, 17(4), 395-416.
[11] M. Ester, K. Hans-Peter, S. Jorg and X. Xiaowei, "A Density-Based Procedure for Discovering Clusters in Large Spatial Databases with Noise," in Proceedings of the 2nd International Conference on Knowledge Discovery and Data Mining, Portland, Oreg., AAAI Press, 1996, pp. 226-231.
[12] Garcia, J. A., Fdez-Valdivia, J., Cortijo, F. J. and Molina, R. "A dynamic approach for clustering data," in Signal Processing, Vol 44, No. 2, 1994, pp. 181-196.

Without prejudice to the underlying principles, the details and embodiments may vary, even significantly, with respect to what is illustrated herein purely by way of non-limiting example, without thereby departing from the extent of protection.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
automatically clustering, using image processing circuitry, a set of images into a set of first clusters of images and a set of unclustered images based on similarity scores of descriptors of the images of the set of images, without setting a number of clusters in the set of first clusters prior to the clustering;
automatically merging, using the image processing circuitry, clusters of said set of first clusters of images to produce a set of second clusters of images;
automatically assigning, using the image processing circuitry, each image of the set of unclustered images to one of:
a cluster of the set of second clusters of images; and
a respective outlier image cluster; and
maintaining an image database based on the clustering, wherein the automatically assigning each image of the set of unclustered images comprises:
automatically determining distance scores between an image of the set of unclustered images and respective clusters of the set of second clusters;
identifying a cluster of the set of second clusters which is closest to the image of the set of unclustered images based on the distance scores between the image of the set of unclustered images and the respective clusters of the set of second clusters;
comparing a distance score between the image of the set of unclustered images and the identified cluster of the set of second clusters to an outlier threshold value; and
assigning the image of the set of unclustered images to one of the identified cluster of the set of second clusters and the respective outlier image cluster based on the comparing of the distance score between the image of the set of unclustered images and the identified cluster of the set of second clusters to the outlier threshold value.

2. The method of claim 1 wherein the automatically clustering the set of images into the set of first clusters of images comprises:

determining for each image of the set of images similarity scores between said image and other images in the set of images; and clustering the images in said set of images to produce the set of first clusters of images based on the similarity scores.

3. The method of claim 2, comprising:

generating a matrix S of similarity scores $s_{ij}$, where $s_{ij}$ represents a similarity score between an image i and an image j of the set of images.

4. The method of claim 2 wherein the automatically clustering the set of images into said set of first clusters of images comprises:

automatically comparing a similarity score between an unclustered image of the set of images and an image in one of the clusters of the set of first clusters to a similarity threshold value and adding the unclustered image to the one of the clusters of the set of first clusters based on the comparing.

5. The method of claim 1 wherein the automatically merging clusters of said set of first clusters of images to produce the set of second clusters of images is based on distances between said clusters in said set of first clusters.

6. The method of claim 5 wherein a distance between a pair of clusters of the set of first clusters is an average of distances between images of a first cluster of the pair of clusters and images of a second cluster of the pair of clusters.

7. The method of claim 5 wherein the automatically merging clusters of said set of first clusters to produce the set of second clusters includes:

automatically comparing a distance score between an unmerged cluster of the set of first clusters and a cluster assigned to one of the clusters of the set of second clusters to a distance threshold value and adding the unmerged cluster to the one of the clusters of the set of second clusters based on the comparing.

8. The method of claim 1 wherein a distance score between the image of the set of unclustered images and a cluster of the set of second clusters is an average value of distance scores between said image of the set of unclustered images and a set of images in said cluster of said set of second clusters.

9. The method of claim 1, comprising:

detecting objects in images of the set of images;

setting respective object flags of images in the set of images based on the detecting; and partitioning the set of second clusters and the outlier image clusters into sub-clusters based on the respective object flags of the images.

10. A system, comprising:

one or more memories; and digital image processing circuitry, which, in operation:

clusters a set of images into a set of first clusters of images and a set of unclustered images based on image similarity scores of descriptors of images of the set of images, without setting a number of cluster of the set of first clusters prior to the clustering;

merges clusters of said set of first clusters of images, producing a set of second clusters of images;

assigns each image of the set of unclustered images to one of:

a cluster of the set of second clusters of images; and an outlier image cluster; and maintains an image database based on the clustering, wherein the assigning each image of the set of unclustered images comprises:

determining distance scores between an image of the set of unclustered images and respective clusters of the set of second clusters;

identifying a cluster of the set of second clusters which is closest to the image of the set of unclustered images based on the distance scores between the image of the set of unclustered images and the respective clusters of the set of second clusters;

comparing a distance score between the image of the set of unclustered images and the identified cluster of the set of second clusters to an outlier threshold value; and assigning the image of the set of unclustered images to one of the identified cluster of the set of second clusters and the respective outlier image cluster based on the comparing of the distance score between the image of the set of unclustered images and the identified cluster of the set of second clusters to the outlier threshold value.

11. The system of claim 10 wherein the digital image processing circuitry, in operation:

determines for each image of the set of images similarity scores between said image and other images in the set of images; and clusters the images in said set of images into the set of first clusters of images and the set of unclustered images based on the similarity scores.

12. The system of claim 11 wherein the digital image processing circuitry, in operation:

generates a matrix S of similarity scores $s_{ij}$, where $s_{ij}$ represents a similarity score between an image i and an image j of the set of images.

13. The system of claim 11 wherein the digital image processing circuitry, in operation:

compares a similarity score between an unclustered image of the set of images and an image in one of the clusters of the set of first clusters to a similarity threshold value and selectively adds the unclustered image to the one of the clusters of the set of first clusters based on the comparing.

14. The system of claim 10 wherein the merging clusters of said set of first clusters of images is based on distances between said clusters in said set of first clusters.

15. The system of claim 14 wherein a distance between a pair of clusters of the set of first clusters is an average of distances between images of a first cluster of the pair of clusters and images of a second cluster of the pair of clusters.

16. The system of claim 14 wherein the merging clusters of said set of first clusters comprises:

comparing a distance score between an unmerged cluster of the set of first clusters and a cluster assigned to one of the clusters of the set of second clusters to a distance threshold value and selectively adding the unmerged cluster to the one of the clusters of the set of second clusters based on the comparing.

17. The system of claim 10 wherein the digital image processing circuitry, in operation:

detects objects in images of the set of images;

sets respective object flags of images in the set of images based on the detecting; and partitions at least one of the set of second clusters and the outlier image clusters into sub-clusters based on the respective object flags of the images.

18. The system of claim 10 wherein the digital image processing circuitry comprises:

at least one descriptor generator, which, in operation, generates descriptors of images of the set of images.

19. The system of claim 10, comprising at least one of:
an image capture device, which, in operation, generates digital images of the set of images; and
a display, which, in operation, displays one or more images based on the clustering.

20. A device, comprising:
descriptor generation circuitry, which, in operation, generates descriptors of images of a set of images; and
digital image processing circuitry, coupled to the descriptor generation circuitry, and which, in operation:
clusters a set of images into a set of first clusters of images and a set of unclustered images based on similarity scores of the generated descriptors, wherein a number of clusters in the set of first clusters is not set prior to the clustering;
merges clusters of said set of first clusters of images, producing a set of second clusters of images;
assigns each image of the set of unclustered images to one of:
a cluster of the set of second clusters of images; and
an outlier image cluster; and
maintains an image database based on the clustering, wherein the assigning each image of the set of unclustered images comprises:
determining distance scores between an image of the set of unclustered images and respective clusters of the set of second clusters;
identifying a cluster of the set of second clusters which is closest to the image of the set of unclustered images based on the distance scores between the image of the set of unclustered images and the respective clusters of the set of second clusters:
comparing a distance score between the image of the set of unclustered images and the identified cluster of the set of second clusters to an outlier threshold value; and
assigning the image of the set of unclustered images to one of the identified cluster of the set of second clusters and the respective outlier image cluster based on the comparing of the distance score between the image of the set of unclustered images and the identified cluster of the set of second clusters to the outlier threshold value.

21. The device of claim 20 wherein the digital image processing circuitry, in operation:
determines for each image of the set of images similarity scores between said image and other images in the set of images based on the generated global descriptors; and
clusters the images in said set of images into the set of first clusters of images and the set of unclustered images based on the similarity scores.

22. The device of claim 20 wherein the merging clusters of said set of first clusters of images is based on distances between said clusters in said set of first clusters.

23. A non-transitory computer-readable medium containing contents which configure digital image processing circuitry to perform a method, the method comprising:
clustering a set of images into a set of first clusters of images and a set of unclustered images based on image similarity scores of descriptors of images of the set of images, without setting a number of clusters in the set of first clusters prior to the clustering;
merging clusters of said set of first clusters of images, producing a set of second clusters of images;
assigning each image of the set of unclustered images to one of:
a cluster of the set of second clusters of images; and
an outlier image cluster; and
maintaining an image database based on the clustering, wherein the automatically assigning each image of the set of unclustered images comprises:
automatically determining distance scores between an image of the set of unclustered images and respective clusters of the set of second clusters;
identifying a cluster of the set of second clusters which is closest to the image of the set of unclustered images based on the distance scores between the image of the set of unclustered images and the respective clusters of the set of second clusters;
comparing a distance score between the image of the set of unclustered images and the identified cluster of the set of second clusters to an outlier threshold value; and
assigning the image of the set of unclustered images to one of the identified cluster of the set of second clusters and the respective outlier image cluster based on the comparing of the distance score between the image of the set of unclustered images and the identified cluster of the set of second clusters to the outlier threshold value.

24. The non-transitory computer-readable medium of claim 23 wherein the method comprises:
determining for each image of the set of images similarity scores between said image and other images in the set of images; and
clustering the images in said set of images into the set of first clusters of images and the set of unclustered images based on the similarity scores.

25. The non-transitory computer-readable medium of claim 23 wherein the set of unclustered images is an empty set.

26. The method of claim 1 wherein maintaining the image database comprises:
deleting images from the image data base.

* * * * *